(12) United States Patent
Perretta et al.

(10) Patent No.: US 11,669,520 B1
(45) Date of Patent: Jun. 6, 2023

(54) NON-STRUCTURED DATA ORIENTED COMMUNICATION WITH A DATABASE

(71) Applicant: COUPA SOFTWARE INCORPORATED, San Mateo, CA (US)

(72) Inventors: Lacey Perretta, Pittsburgh, PA (US); Rich Wilkie, Pittsburgh, PA (US); Michael David Angle, Warwick, NY (US); Sandeep Damodar Bhide, Randolph, NJ (US)

(73) Assignee: Coupa Software Incorporated, San Mateo, CA (US)

(*) Notice: Subject to any disclaimer, the term of this patent is extended or adjusted under 35 U.S.C. 154(b) by 0 days.

(21) Appl. No.: 17/901,219

(22) Filed: Sep. 1, 2022

Related U.S. Application Data

(63) Continuation of application No. 16/455,368, filed on Jun. 27, 2019, now Pat. No. 11,500,909.

(60) Provisional application No. 62/691,109, filed on Jun. 28, 2018.

(51) Int. Cl.
  *G06F 3/048* (2013.01)
  *G06F 16/242* (2019.01)
  *G06Q 30/0203* (2023.01)

(52) U.S. Cl.
  CPC ...... *G06F 16/2428* (2019.01); *G06F 16/2425* (2019.01); *G06Q 30/0203* (2013.01)

(58) Field of Classification Search
  CPC ............... G06Q 30/02; G06Q 30/0203; G06Q 30/0201; G06Q 30/0245; G06F 16/9535; G06F 16/248; G06F 16/335; G06F 3/0482; G06F 3/0481; G06F 16/3344; G06F 16/338; G06F 16/3329
  See application file for complete search history.

(56) References Cited

U.S. PATENT DOCUMENTS

| 5,893,098 A | 4/1999 | Peters |
| 5,924,089 A | 7/1999 | Mocek |
| 6,189,029 B1 | 2/2001 | Fuerst |
| 6,477,504 B1 | 11/2002 | Hamlin |
| 6,574,621 B1 | 6/2003 | Lautzenheiser |
| 6,574,638 B1 | 6/2003 | Gustman |
| 6,581,071 B1 | 6/2003 | Gustman |
| 7,020,658 B1 | 3/2006 | Hill |
| 7,054,827 B1 | 5/2006 | Lautzenheiser |

(Continued)

OTHER PUBLICATIONS

Research Process: A Step-by-Step Guide: 2f. Search Strategies, Georgia Tech Library, Research Guides, 2021, 2 pages.

(Continued)

*Primary Examiner* — Steven B Theriault
(74) *Attorney, Agent, or Firm* — Baker Botts L.L.P.

(57) ABSTRACT

Techniques for communicating with a third-party management database are described herein. According to an embodiment, a computer receives a search-style query, searches the third-party management database, retrieves multiple computer-readable database search strings, displays the computer-readable database search strings, and receives a selected computer-readable database search string. In response, the computer queries the third-party management database using the selected search string, returns a temporary variable associated with a supplier risk score, and receives a command to perform a decision step as part of a workflow.

20 Claims, 3 Drawing Sheets

(56) References Cited

U.S. PATENT DOCUMENTS

| | | | |
|---|---|---|---|
| 7,539,696 B1 | 5/2009 | Greener | |
| 7,801,845 B1 | 9/2010 | King | |
| 8,332,772 B2 | 12/2012 | Janzen | |
| 8,554,802 B1 | 10/2013 | Barden | |
| 8,706,909 B1 | 4/2014 | Nickson | |
| 8,712,824 B1 | 4/2014 | Julian | |
| 10,049,163 B1 | 8/2018 | Sarmento | |
| 10,163,117 B2 | 12/2018 | Edmonds | |
| 10,181,984 B1 | 1/2019 | Henderson | |
| 10,817,508 B2 | 10/2020 | Arquie | |
| 11,210,621 B1* | 12/2021 | Barber | G06Q 10/0639 |
| 2001/0049621 A1 | 12/2001 | Raposo | |
| 2002/0052774 A1 | 5/2002 | Parker | |
| 2002/0147850 A1 | 10/2002 | Richards | |
| 2002/0188777 A1 | 12/2002 | Kraft | |
| 2004/0128183 A1 | 7/2004 | Challey | |
| 2005/0004911 A1 | 1/2005 | Goldberg | |
| 2005/0193333 A1 | 9/2005 | Ebert | |
| 2005/0197988 A1 | 9/2005 | Bublitz | |
| 2006/0060616 A1 | 3/2006 | Suga | |
| 2006/0106776 A1 | 5/2006 | Dettinger | |
| 2006/0107195 A1 | 5/2006 | Ramaswamy | |
| 2006/0265348 A1 | 11/2006 | Weerman | |
| 2007/0192166 A1 | 8/2007 | Van Luchene | |
| 2007/0192168 A1 | 8/2007 | Van Luchene | |
| 2007/0192785 A1 | 8/2007 | Pellinat | |
| 2008/0010351 A1 | 1/2008 | Wardhaugh | |
| 2008/0126173 A1 | 5/2008 | Crysel | |
| 2008/0243586 A1 | 10/2008 | Dohring | |
| 2008/0270218 A1 | 10/2008 | Scott | |
| 2008/0288271 A1 | 11/2008 | Faust | |
| 2009/0119258 A1 | 5/2009 | Waters | |
| 2009/0182711 A1 | 7/2009 | Barsness | |
| 2011/0076663 A1 | 3/2011 | Krallman | |
| 2011/0099502 A1 | 4/2011 | Kim | |
| 2011/0145279 A1 | 6/2011 | Chunilal | |
| 2011/0276513 A1 | 11/2011 | Erhart | |
| 2011/0296294 A1 | 12/2011 | Bhadury | |
| 2012/0072261 A1 | 3/2012 | Oberoi | |
| 2012/0316981 A1* | 12/2012 | Hoover | G06F 16/25 705/26.4 |
| 2013/0014153 A1 | 1/2013 | Bhatia | |
| 2013/0086067 A1 | 4/2013 | Khoussainova | |
| 2013/0096985 A1 | 4/2013 | Robinson | |
| 2013/0111323 A1 | 5/2013 | Taghaddos | |
| 2013/0282458 A1 | 10/2013 | Roberts | |
| 2013/0330703 A1 | 12/2013 | Chivukula | |
| 2014/0108494 A1 | 4/2014 | Kahlert | |
| 2014/0143157 A1 | 5/2014 | Jeffs | |
| 2014/0156349 A1 | 6/2014 | McLoughlin | |
| 2014/0189548 A1 | 7/2014 | Werner | |
| 2014/0222514 A1 | 8/2014 | Huang | |
| 2014/0272902 A1 | 9/2014 | Bleile | |
| 2014/0278550 A1 | 9/2014 | Pestka | |
| 2014/0278786 A1 | 9/2014 | Liu-Qiu-Yan | |
| 2014/0280289 A1 | 9/2014 | Marantz | |
| 2014/0310062 A1 | 10/2014 | Klein | |
| 2015/0193794 A1 | 7/2015 | Douglas | |
| 2015/0235244 A1 | 8/2015 | Anderson | |
| 2015/0310456 A1 | 10/2015 | Vandenburgh | |
| 2015/0324445 A1 | 11/2015 | Tseng | |
| 2015/0356573 A1 | 12/2015 | Zadrozny | |
| 2016/0042370 A1 | 2/2016 | Ludwig | |
| 2016/0210646 A1 | 7/2016 | Edmonds | |
| 2016/0370954 A1 | 12/2016 | Burningham | |
| 2017/0068967 A1 | 3/2017 | Montoya | |
| 2017/0123643 A1 | 5/2017 | Berns | |
| 2017/0161759 A1 | 6/2017 | Li | |
| 2017/0323316 A1 | 11/2017 | Wheeler | |
| 2018/0060886 A1 | 3/2018 | Cheesman | |
| 2018/0060890 A1 | 3/2018 | Noter | |
| 2018/0089412 A1 | 3/2018 | Kopikare | |
| 2018/0114237 A1 | 4/2018 | Kirk | |
| 2018/0122256 A1 | 5/2018 | Smith | |
| 2018/0145840 A1 | 5/2018 | Advani | |
| 2018/0247323 A1 | 8/2018 | Sayres | |
| 2019/0012685 A1 | 1/2019 | Badereddin | |
| 2019/0019204 A1 | 1/2019 | Kopikare | |
| 2019/0057414 A1 | 2/2019 | Taylor | |
| 2019/0066136 A1 | 2/2019 | Kopikare | |
| 2019/0147507 A1 | 5/2019 | Lukacsko | |
| 2019/0266533 A1* | 8/2019 | Harris | G06Q 10/0635 |
| 2019/0325464 A1 | 10/2019 | Wood | |
| 2020/0051172 A1 | 2/2020 | Agnew | |
| 2021/0027326 A1 | 1/2021 | Simon | |

OTHER PUBLICATIONS

TechTarget Contributor, Definition, Search String, available at www.Whatis.com, Aug. 2016, 2 pages.

Germain, Strings, CS Professor Definition, available at https://www.cs.utah.edu/~germain/PPS/Topics/strings.html, 2 pages.

String Definition, The Linux Information Project, 2007, 2 pages.

* cited by examiner

FIG. 2

| Home | Suppliers | Engagements | Relationships | Products | Assessments | Programs | Reports | Community | Programs | Admin | Program Admin | Admin | Survey |

All changes saved    Workspaces: J. Doe    Last Login:    (15) Welcome, J. Doe

Enter Keyword(s) 🔍

SURVEY

General Information

\* Please respond to all questions. Some questions may be unavailable until previous responses are provided. — 302

▽ Survey Items

Descriptive Text
1. Please review our terms and conditions — 304
   📄 2018_Terms&Conditions.docx Fields File Upload
2. Please indicate the size of your organization: — 306
   ○ 1-50
   ○ 51-250
   ○ 251-1000
   ○ 1001-10,000
   ○ 10,001+

Multiple Choice

View Download

Section
3. Please note the country in which you are headquartered: — 308
   Select all | Clear All
   ○ Myanmar/Burma   ○ Kyrgyz Republic   ○ Solomon Islands
   ○ Burundi         ○ Laos              ○ Somalia
   ○ Cambodia        ○ Latvia            ○ South Africa
   ○ Cameroon        ○ Lebanon           ○ South Korea
   ○ Cape Verde      ○ Lesotho           ○ South Sudan △ Library △ Navigation

FIG. 3

NON-STRUCTURED DATA ORIENTED COMMUNICATION WITH A DATABASE

BENEFIT CLAIM

This application claims the benefit under 35 U.S.C. § 120 as a continuation of application Ser. No. 16/455,368, filed Jun. 27, 2019, which claims the benefit under 35 U.S.C. § 119(e) of provisional application 62/691,109, filed Jun. 28, 2018, the entire contents of which applications are hereby incorporated by reference for all purposes as if fully set forth herein.

FIELD OF THE DISCLOSURE

The present disclosure is in the technical field of database search query processing. The disclosure also is in the technical field of database search query processing as applied to risk assessment using expression-type search queries.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Electronic enterprise management software provides businesses with software functionality for generating various types of data management reports. One specific functionality of electronic enterprise management software gaining popularity in recent years is survey data collection for various applications. A common enterprise data collection application can prove invaluable in advancing enterprise business goals and growth, survey data collection is an example. Survey data is knowledge, knowledge can be powerful. Survey data provides vital feedback to businesses that can help place businesses ahead of their competition. Businesses are gainfully empowered to take measures they would otherwise remain unknown. For example, partner, customer, and third-party feedback can even help place an enterprise ahead of its competition with greater product or service marketability features, efficiency and reliability, cost and time cutting measures, and even warrant products, procedures, and/or services re-design. Survey data can therefore prove to be a key source of information to enterprises.

Electronic enterprise management software can facilitate business process management ("BPM"), an application of which is to third party management. Third parties to an enterprise can include smart data repositories such as databases. Access to and communication with today's databases typically require a level of sophistication not readily found in the marketplace. Extensive knowledge of a query language is often a pre-requisite to managing contents of a database. An example is use of the query language, in an enterprise environment, for communicating with a third-party management database to enable monitoring, managing and assessing enterprise third parties—a rather complex, specialized, and costly task.

Thus, there is a need for an improvement to systems and methods facilitating ease of communicating with an enterprise database.

SUMMARY

The appended claims may serve to summarize the disclosure.

BRIEF DESCRIPTION OF THE DRAWINGS

In the drawings:

FIG. 2 shows an example graphical user interface ("GUI") generated by in accordance with an embodiment and method of the disclosure.

FIG. 3 shows an example graphical user interface ("GUI") generated by in accordance with an embodiment and method of the disclosure.

DETAILED DESCRIPTION

Figure 1:
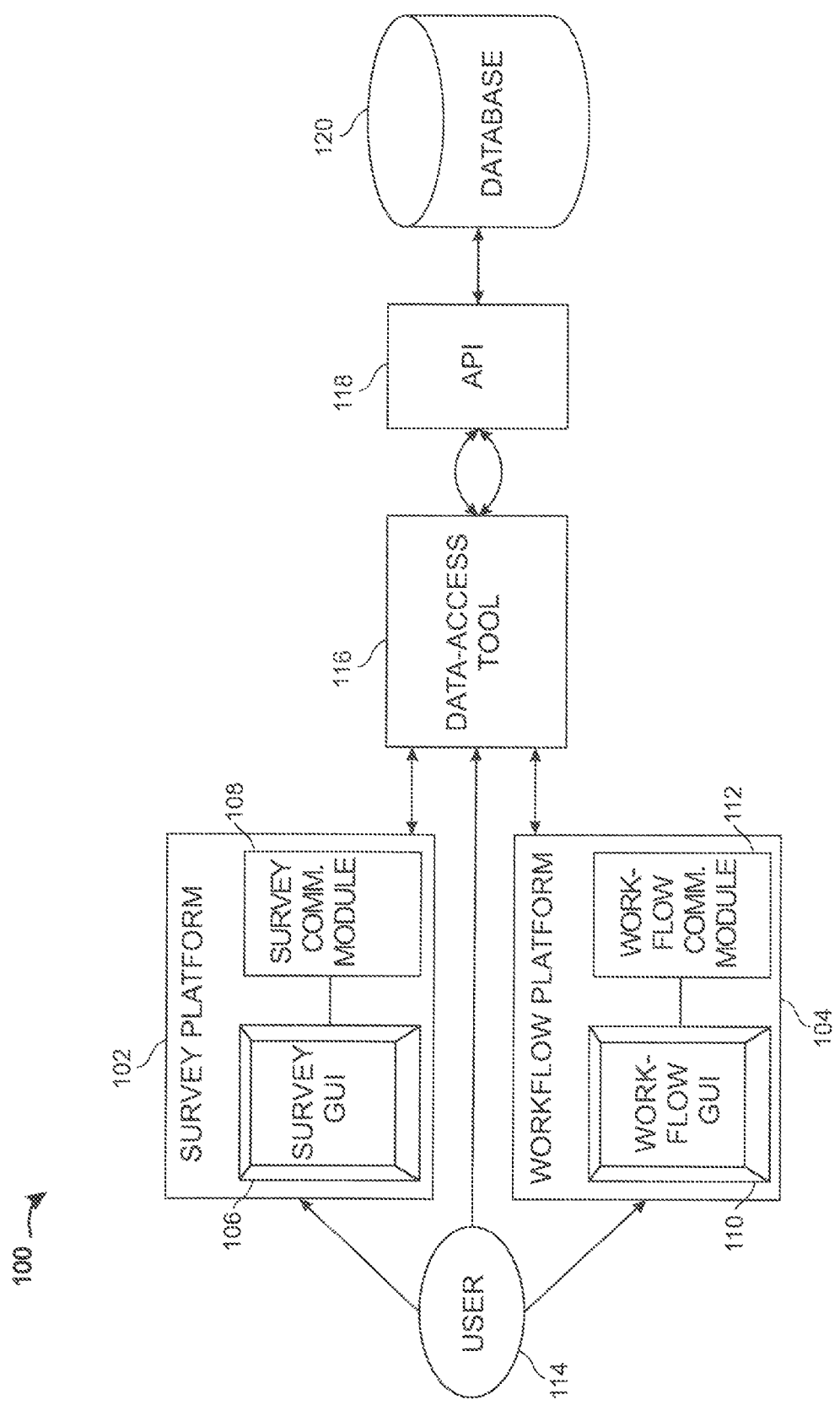
FIG. 1 shows a system block diagram in accordance with an embodiment of the disclosure.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Techniques for utilizing non-structured-data-oriented language code for communicating with a database are described herein. Systems and methods for enabling implementation of non-structured-data-oriented communication with a third-party management database are provided. The third-party management database may be accessed, via an application programming interface ("API"), in a non-data-oriented way. A data-access tool may be coupled to the API for communicating with the database.

A system user may be associated with an entity. The system user may utilize the system to manage the entity's third parties. System user(s) may not require comprehensive knowledge of the third-party management database in order to access data in the database. This may be enabled because of the simplicity and familiarity of the variables, statements, operators and comparators that may be used in the language. A user may not be required to know all relationships in a database in order to properly query the database.

The method for enabling implementation of non-structured-data-oriented communication with a third-party management database may include receiving a search-style query for extracting the data from the third-party management database. The method may further include searching the database for one or more variables that may be associated with the search-style query. The search-style query may include a variable name. The search-style query may include a partial variable name. The search-style query may include an operator. The search-style query may also include a parameter. The search-style query may further include a keyword or any other suitable query terms.

In response to the searching, the method may further include retrieving, from the database, a plurality of computer-readable database search strings associated with the one or more variables.

When the search-style query includes the partial variable name, the method may further include auto-completing the search-style query. The method may further include displaying to the user, the retrieved plurality of computer-readable database search strings. The user may then be enabled to determine a user-intended search string from the plurality of search strings. The method may then further include receiving a user-selected computer-readable database search string from the plurality of retrieved computer-readable database search strings. The user-selected computer-readable database search string may be based, at least in part, on one or more of the plurality of retrieved computer-readable database search strings. The user-selected computer-readable database search string may further include an additional operator in the search string. The user-selected computer-readable database search string may further include an additional parameter in the search string. The user-selected computer-readable database search string may further include an additional keyword in the search string.

When one or more variables are not found to be associated with the search-style query, the method may further include alerting the user. The method may further include prompting the user with auto-generated additional options of words related to the search-style query received. The words may include variables. The words may include search terms. The words may also include query terms.

Structural Overview

A third-party management system for enabling implementation of non-structured-data-oriented communication with a third-party management database is provided. The third-party management system may include an application programming interface ("API"). The API may enable communication with the database via an expression-type language. The API may be coupled with a data-access tool. The API may be configured to accept, from the data-access tool, search-style queries. The search-style queries may be formulated in the expression-type language.

The third-party management system may also include an electronic workflow platform. The electronic workflow platform may be for monitoring and managing, in real-time, workflow of each third party. The workflow platform may include a workflow graphical user interface ("GUI"). The workflow platform may further include a workflow communication module. The workflow communication module together with the data-access tool and the API may enable communicating with the database. The workflow platform may be a business process modeler that may enable a user(s) to model and manage their entire business process. The workflow GUI may provide visibility to vendor managers. The workflow GUI may be designed to enable users to track a status for completion of the survey for each of the third parties. The status may be in real-time and the user may be able to view in real-time at what step in the survey the third party may be holding. The workflow GUI may enable using drag-and-drop features within the GUI.

An electronic survey platform may also be included in the third-party management system. The electronic survey platform may be for managing and modifying in real-time, execution of a plurality of third-party surveys. The electronic survey platform may include a survey GUI. The electronic survey platform may also include a survey communication module. The survey communication module together with the data-access tool and the API may enable communication with the database. Data from third party surveys may be accessed within the survey GUI. The survey GUI may assist the user through the construction of conditions and scores associated with the questions on each third-party survey.

The third-party management system may be designed within a microservices architecture. Microservices architectures may disaggregate each feature of the third-party management system into individual components. The electronic survey platform and the electronic workflow platform may be individualized for each of the users. The survey platform may be disaggregated from the workflow platform. The survey platform and the workflow platform may act independently. The disaggregating may enable increased performance and may further allow for the system to scale third party management features more efficiently. When a feature component requires modification, the whole system may not require building and deploying of a new version of the system. Each feature component may preferably be modified separately. By using a microservices architecture, time-to-market may be decreased, and the quality of the system may be improved.

The third-party management system may be a system used by a plurality of users. Every user may have one or more third parties associated with the user. Large enterprises and companies may have thousands of third parties associated with the enterprise or company. A third party may be a vendor. A third party may be a supplier. The third-party management system may be configured to generate an individualized survey for each third party. The survey may include a plurality of questions. The questions may be unique for each of the third parties. Third parties may be required to answer the plurality of questions on the generated survey. The questions included in the survey may be generated based on a nature of a relationship between the third party and the user.

Each question within each third-party survey may be either a single-select multiple-choice question type or a multiple-select multiple-choice question type. Each question may also include a plurality of selectable answer options. Each question may also include one or more metadata attributes tagged to each question.

The metadata attributes tagged to one or more questions may include a score attribute. Each selectable answer option may have a pre-determined score value assigned to the selectable answer option. The score value may be a score between 1 and 10. The score value may be a score between 1 and 100. The score value may be adjusted for each third party. Users may be enabled to query the third-party management database for the score to a specified question based on the pre-determined score value assigned to the selectable answer option selected by the third-party respondent. A score may be calculated for one or more sections within the survey based on the pre-determined score value assigned to all selected selectable answer options within the section of the survey. A score may be calculated for all questions within the survey based on the pre-determined score value assigned to all selected selectable answer options for each question of the survey. A detailed description of the score attribute follows in examples 4-5 below.

The metadata attributes tagged to one or more questions may also include a visibility attribute. The visibility attribute may enable making visible a question based on a previously selected selectable answer option. For example, in response to an answer option selected by a third-party respondent, the survey communication module may be configured to, via the API, in real-time, transmit the selected answer option to the database. The API may be configured to search and determine, from the database, all questions that may include the visibility attribute tagged to the question and further include data relating to the data of the selected answer option. The database may return the determined questions to the API. The data-access tool may be further configured to make visible the determined question(s) in the survey in order to prompt the third party's response.

An aspect of the disclosure includes real-time communication between the survey and the database. This real-time communication enables complicated conditional and visibility attributes to be associated with one or more questions in the survey. The survey may communicate with the database, in real-time, and pull real-time data from the database. The real-time data may be used to process conditional attributes associated with survey questions. This improves upon prior art systems because prior art systems require conditionality and visibility logic to be embedded in a static survey script. Survey scripts are limited in the amount of data and conditionality they can hold because survey scripts that include greater than a threshold level of complexity may be difficult to load, cumbersome to manipulate and require large amounts of central processing unit (CPU) processing time. Surveys that include real-time communication and read/write communication with the database may shorten the time-to-first-byte and strengthen the underlying system.

When the conditional attribute is tagged to a question, there may be a conditional statement that may be necessary to be met in order for the question to be displayed to the user in the survey. The conditional statement may link the question to a previous question, and the question may only be populated within the survey based on the answer option selected by the third-party respondent to the previously linked question.

For example, in response to a selected selectable answer option submitted by a third-party respondent to a question including the conditional attribute tagged to the question, the API may be configured to determine, from the database, a subset of survey questions that may be associated with the submitted answer. The API may be further configured to retrieve from the database the subset of associated survey questions. The API may be further configured to, via the data-access tool, populate the survey with the subset of associated survey questions. The subset of associated survey questions may be populated preferably immediately following receiving the response to the previously linked question. The previously linked question may be the question associated with the question tagged with the conditional attribute.

When the requirement attribute is tagged to the question, the third-party respondent may be required to select at least one selectable answer option associated with the question prior to responding to a subsequent question. The subsequent question(s) may be disabled until the respondent selects an answer(s) to the question that includes the requirement attribute. For example, the subsequent questions may be greyed out or may be invisible.

In another embodiment of the disclosure, one or more users of the third-party management system may desire accessing third party data from the third-party database. The data-access tool coupled to the API may be configured to receive from the user a search-style query. The search-style query may be a query for retrieving third party data. The user may query the database for a status of completion for a third-party survey. The user may query the database for a score value for a specific question, section and/or the entire survey for one or more associated third parties. The user may query the database for an email address. The user may query the database for one or more answers to one or more questions that the third-party respondent answered. The search-style query may be inputted into a search-box on the GUI.

The data-access tool may be configured to access real-time data from the database. The data-access tool may retrieve data from the database directly. The data-access tool may also be configured to access data from a cache. The cache may be set to take a snapshot image of the system at a pre-determined launch time. The pre-determined launch time may be set to launch at the close of business of each day. The pre-determined launch time may be set to launch at the start of business each day, or any other suitable period of time.

When the data-access tool receives the search-style query, the API may be configured to search for one or more variables that may be associated with the search-style query. The API may be further configured to, in response to the search, retrieve from the database a plurality of computer-readable database search strings. The computer-readable database search strings may be search strings associated with the one or more variables.

The data-access tool may be configured to display to the user the retrieved plurality of computer-readable database search strings. The user may select a search string from the plurality of search strings. The selected search string may be the search string the user intended to query. The API may be configured to receive the user-selected computer-readable database search string. The API may be further configured to query the database with the user-selected computer-readable database search string. The API may be further configured to return to the user, one or more results from the database, via the data-access tool. The results may include the requested score. The results may include the status of completion of the survey for a third party. The results may include the email address requested. The results may include the answer to the one or more questions requested. The results may include any other suitable results within accordance of the invention.

An error message may be returned when no results are found. An error message may be returned when the search string is not accurate. An error message may also be returned when there are no matches or related data associated with the search query found.

Each survey may be programmed using an expression-type language. Each survey may be controlled by the expression-type language. The API may communicate with the database using the expression-type language. The expression-type language may encompass familiar statements, operators and comparators. The familiarity and simplicity of the language may reduce each user's learning curve. The simplicity of the language may increase ease of use. Although simple, very sophisticated operations may be possible. The communication system, using the expression-type language, may enable virtually seamless access to all third-party management data associated with the user.

Because the expression-type language may be written in a familiar format, each user may be able to access data, from the database, inputted by the third party, via the data-access tool. A user may be enabled to perform a search for data on the database. A user may be enabled to query the database. A user may further be enabled to write to the database.

Specified formats may be necessary when referencing and searching, via the data access tool, data in the database. User(s) may write one or more expressions when searching third party management data. User(s) may write one or more statements when searching the data. Common standards for punctuation may be required when writing expressions and/or statements for searching third party management data in the database. The table below displays a listing of exemplary allowable punctuation.

| Allowed Punctuation | | |
|---|---|---|
| Allowed Separators | Symbol | Use |
| Semicolon | ; | Used for separating statements |
| Comma | , | Used for separating items in a list |
| Double quotes | " " | Used for defining a string |
| Forward slash | / | Used to permit quotation marks inside a string |
| Colon | : | Used for referring to a range of data (for example, survey questions 1 through 20) |
| Allowed Groupings | Symbol | Use/example |
| Braces | { } | Used for grouping statements (for example in a compound statement, separated by semicolons) Used for grouping list items (separated by commas) |
| Parentheses | ( ) | Used for defining sequence of operations (precedence; PEMDAS); improving clarity/readability; grouping a list of (parameters) used in a function |
| Square brackets | [ ] | Used to refer to a specific survey section, question, or response |
| Allowed Symbols | Symbol | Use/example |
| At | @ | Used to tag an individual user in a comment on a survey |
| Question mark | ? | Shortcut symbol used in if/then/else conditional statements to replace then |
| Colon | : | Shortcut symbol used in if/then/else conditional statements to replace else |

Functions may be written to the database. A function may be a pre-defined formula for performing calculations in order to return a value. A function may enable executing commands on one or more parameters. The functions may be written and grouped with parenthesis and separated by commas. The table below displays a listing of exemplary allowable functions.

| Defined functions | Use Notes |
|---|---|
| COUNT | Count items in a group |
| MIN | Minimum |
| MAX | Maximum |
| AVERAGE | Average |
| SUM | Sum |
| MEDIAN | Median |
| STDDEV | Standard Deviation |
| VARIANCE | Variance |
| DATEDIFF | Date difference Note: to define the time unit, include one of the following in double quotation marks preceding the list of dates: days, months, years, quarters, weeks, hours, minutes |
| NOW | Used to call system data at current point in time when the Step containing the function is executed |

The system may include keywords. The keywords may be reserved words. The keywords may be defined words within the expression-type language that may not be used for any other purpose. Keywords may not be used as variable names. The table below displays a listing of exemplary allowable defined keywords.

| Defined keywords | Use Notes |
|---|---|
| IF/THEN/ELSE | |
| IN | |
| NOT | Can spell out "NOT" or use exclamation point (!) |
| TRUE/FALSE | |
| SECTION | Can spell out "Section" or "sec" or "S" |
| QUESTION | Can spell out "Question" or "que" or "Q" |
| STEP | |
| SCORE | |
| ANSWER | |
| RESPONSE | Can spell out "Response" or "res" or "R" |
| AND | Can spell out "AND" or use single ampersand (&) or double ampersand (&&) |
| OR | Can spell out "OR" or use single pipe (\|) or double pipe (\|\|) |
| DAYS, MONTHS, YEARS, QUARTERS, WEEKS, HOURS, MINUTES | Used in DateDiff function |

Operators may be designated symbols, words or phrases that may be used for checking, changing or combining values. The table below displays a listing of exemplary allowable operators.

| Operators | Use Notes |
|---|---|
| + | Add |
| − | Subtract |
| * | Multiply |
| / | Divide |
| ! | Use in front of an expression to indicate the inverse of the expression. Can spell out "NOT" or use exclamation point (!) |
| > | Greater than |
| >= | Greater than or equal to |
| < | Less than |
| <= | Less than or equal to |
| == | Is equal to Test of equality (conditional) |
| !==; != | Is not equal to Test of inequality (conditional) |
| AND & && | Boolean operator (resolves to true or false) used with conditional expressions. Can spell out "AND" or use single ampersand (&) or double ampersand (&&) |
| OR \| \|\| | Boolean operator (resolves to true or false) used with conditional expressions. Can spell out "OR" or use single pipe (\|) or double pipe (\|\|) |
| ^ | Power |
| IN | For finding out whether a variable is included in a list. Must be followed by a list. |
| !IN | Not in a defined list |
| = | This is used to write assignment statements and cannot be used in an expression. Means "is." |

The expression-type language may be case insensitive. The system may recognize data in uppercase. The system may recognize data in lowercase. The language may be read and executed from left to right. The operations may be executed from left to right with precedence using the standard mathematical order of operations of parenthesis, exponents, multiplication and division, and addition and subtraction ("PEMDAS"). The system may be configured to disregard "white space."

The database may be configured to enable reading from the database and writing to the database. Writing may be enabled in order to create and calculate a score(s) on one or more selected questions, sections and/or surveys.

Data may be stored in various fields. Each field may be attached to an object. For example, each supplier/vendor may have a 'name' and a 'location.' The 'location' itself is an object and the fields may include a 'city' and 'state.' The fields may be accessed within the data access tool by concatenating them in a single line with a period in between.

The expression-type language may include the use of expressions. An expression may be the specification of a series of operations to be performed on variables, constants, and functions that may result in one value.

The expression-type language may include the use of statements. A statement may be an instruction for manipulating data that may not result in a single value. The statements may include an assignment statement, a compound statement, and a conditional statement.

An assignment statement may be a statement with two sides separated by an equal sign. The assignment statement may represent an instruction to execute the right side of the statement to generate a value and to assign the value to the place designated by the left side of the statement.

A compound statement may be a statement type used for creating sequences of operations within one statement and may require the use of braces.

A conditional statement may be used for making decisions based on data that may meet one or more conditions. The conditional statement may be used in association with the conditional attribute tagged to a question. A detailed description of survey conditionality and workflow conditionality follow in examples 1-3 below.

Each survey may be designed within a survey design tool ("SDT"). The SDT may be located within the electronic survey platform. The SDT may be accessed on the survey GUI within the survey platform. The SDT may enable an SDT user to create and adjust each survey for each third party associated with each SDT user. Within the third-party management system, the SDT user may be the system user.

A workflow design tool ("WDT") may be located within the electronic workflow platform. The WDT may be accessed on the workflow GUI within the electronic workflow platform. The WDT may be accessed by a WDT user. The WDT user may place a survey within an entity's workflow.

There may be an instance of the entity's workflow. When the entity's workflow is instantiated, memory is allocated to both the surveys and the workflow.

There may be an instance of a survey. Once the survey instance is deployed, the survey instance may be populated with data. The WDT user may then be able to access the survey instance. The accessing of the survey instance may include accessing, adjusting and writing to the survey instance.

The WDT may enable the WDT user to manage the workflow. The WDT may enable the WDT user to track a third-party respondent's status of survey completion.

When a third-party respondent answers the survey questions, the data may be inputted to the survey instance and may be stored within the survey instance. In some embodiments, the survey instance links directly to the database. The survey instance can be linked to the database when the instance is instantiated. In other embodiments, the survey instance may link to logic of the survey. The logic of the survey may then be in communication with the database.

The WDT may be configured to enable the WDT user to perform a calculation step(s) and/or a decision step(s) via the data-access tool. The calculation step may allow for a mathematical calculation to be performed on data. The data may be third party management data. The data may be survey data. The results from the calculation may be written back to the third-party management database. There may be a plurality of paths the entity's workflow may follow. The decision step may be a step that enables the WDT user to dictate a specific path to take, through an entity's workflow. The path may be based on the value of third-party management data and/or the survey data. The workflow follows one of the plurality of paths depending on the value of the data. A detailed description of the calculation and decision step follows in example 7A-7B below.

The WDT may be further configured to enable the WDT user to perform a result-in-field ("RIF") step. A detailed description of the RIF step follows in example 8 below.

When each survey is designed, all sections, questions and responses may be assigned an auto-generated unique identifier. The identifiers may be generated at the time the item is created. Identifiers may allow for data to be used with a survey. Identifiers may allow for data to be used within the workflow platform and may not necessitate writing back to the third-party database. The identifier format may be four alpha-numeric characters. An example of an identifier may be "t76w." Each identifier may begin with a letter and may be generated without any pattern. When an identifier is referenced, it may be referenced with a letter or word that may indicate which identifier-type it is. The identifier-types may be a question, section and/or response. The format for referring a section with the identifier "t76w," may be "s[t76w]." Another way to reference the identifier may be "sec[t76w]". A third way to reference the identifier may be "section[t76w]."

When the survey is designed, the identifiers may be overwritten for ease of use. Each identifier may be unique across the survey. The survey itself may not include an identifier. The survey may be defined as "survey" and may not be redefined.

The table below depicts an example of identifiers and how they may be referenced.

| | Survey | Section | Question | Response |
|---|---|---|---|---|
| Identifier Format | survey | 4 alpha-numeric characters, beginning with a letter, generated with no pattern | | |
| Identifier Example | survey | t39w | ek9r | z829 |
| How to reference | N/A | s[t39w] sec[t39w] section [t39w] | q[ek9r] que[ek9r] question [ek9r] | r[z829] res[z829] response [z829] |
| Attributes Available | score | score | score answer | score |
| Attribute Example | survey.score | S[t39w].score | Q[ek9r].score Q[ek9r].answer | R[x829].score |

Within the WDT, user-centric steps may be defined. There may be survey steps and approval steps. These defined steps may assist in managing the workflow for the user of the system. Each survey step and each approval step may be assigned auto-generated unique identifiers at the time the step is created. The identifier, when applied to a survey variable, may allow the user to refer to that data from the specified step. The default identifier may be overwritten by the WDT user, for ease of use. Any identifier may be unique across the workflow platform. These identifiers may be visible within the applicable workflow step. The table below may show an example of identifiers for the survey and approval steps.

|  | Survey Identifier | Approval Identifier |
|---|---|---|
| Format | S1, S2, S3, . . . | A1, A2, A3, . . . |
| Example | third Survey: S3 | first Approval: A1 |
|  |  | second Approval: A2 |

Third party data may be tied to a survey or workflow object (standard fields, user defined fields, standard objects, user defined objects, users, groups, and teams). These objects may be referenceable within the SDT and the WDT and may include limitation. Lists (multiple pieces of information of the same data type) may not be written back to the third-party database. Aggregates (many-to-one data types) may require the use of functions (AVG, MIN, MAX, SUM, COUNT) to reference the data.

The table below may show an example of objects.

| Data Type | Format | Example |
|---|---|---|
| Third party Data | ObjectName.FieldName | supplier.relationshipmanager |
| Number | Can be integer, hex, floating point (decimal), exponent. Cannot be a fraction or repeating decimal. | 398.75 |
| Date | YYYY-MM-DD format. Can optionally include time: YYYY-MM-DDTHH:MM (Time must refer to UTC.) | 2010 May 29 |
| List | Separated by commas and surrounded by braces | {Russia, Canada, U.S., Mexico} |

Furthermore, within a survey, the SDT user may create a temporary variable to use throughout the workflow platform without requiring writing that data back to the database. When creating a temporary variable, the SDT user may create the variable (e.g. ContractValue) and may use it on the left side of an assignment statement within a "write" portion of the survey.

When tagging a question with a conditional attribute, the conditional statement may only drive forward behaviors. The conditional statement may not act on previous questions. For example, responses to questions 1, 2 and 3 may drive the behavior of question 4. However, question 5 may not be conditioned to be hidden based on subsequent question 7.

The conditional statement may be required to be tagged to the question or section that may be dependent on the condition that is set—i.e., question 7 may be hidden based on a response to question 5, the conditional statement may be tagged to question 7 and may reference the appropriate data from question 5. Question 5, in the example, has a direct relationship to question 7 and is dependent on the answer selected by the third-party respondent for question 5. If a series of questions is preferred to be hidden based on a response from a previous question, the questions may be placed within one section and then may enable the conditional statement to be written one time and tagged to the one section.

Example 1

In a single-select example, a survey may include 100 questions. The SDT user may show certain questions for the third party to complete based on the four possible responses to question 2 on the survey. The survey may be designed by placing questions 3-20 in a second section, questions 21-50 in a third section, questions 51-89 in a fourth section and questions 90-100 in a fifth section. Table 1 below may depict this example.

TABLE 1

| Question 2 Identifier | g42y | | | |
|---|---|---|---|---|
| Question 2 Response | Russia | U.S. | Canada | Mexico |
| Response Identifier | r2d2 | bc38 | m49c | x2ys |
| Survey sections to complete based on the response to Question 2 | Section 5 | Section 2 | Section 3 | Section 4 |
| Section level conditional statement | R[r2d2] | R[bc38] | R[m49c] | R[x2ys] |

In certain embodiments, question 2 from the example above may be a multi-select example. If the third-party respondent selects both "Russia" and "US" as the collective answer, the section level conditional statements may still apply. Both the "Russia" and "US" sections may be available for the user to answer.

In a multi-select example using Table 1 above, the survey may be designed to limit a section to be displayed when only a particular choice may be selected. The conditionality statement may call out only that section. Using the example table above, the survey may be designed such that when the third-party respondent selects "US" and "Russia" for an answer, the "Russian" section may only be displayed and not the "US" section. The same section-level conditional statement on the Russia section may be written. However, on the "US" section the statement may be written as Q[g42y] .answer {"bc38"}. This statement is stating that the "US" section may only be available when only the "US" is selected as an answer.

Example 2—Survey Conditionality

Question number 4 on a survey may prompt the third-party respondent to provide the expiration date of the respondent's insurance certificate. If the answer is less than three months from today, section 2 of the survey may be hidden. If the answer is greater than three months from today, the respondent may be required to complete section 2. The identifier assigned to question 4 may be "xy2z."

Sample—Conditionality Statement Tagged to Section 2

"DateDiff("days", R[xy2z], today( ))>90."

Example 3—Workflow Conditionality

Question number 6 on a survey may ask the third-party respondent to select one of three answer options. The three answer options may be "Russia", "Canada", or "US." The WDT user may use the answer option selected to the question to determine which path the workflow may take. The WDT user may need to identify two sets of information. The identifier for each response may need to be identified. The step within the workflow may need to be identified. In this example, the survey identifier is S1, the approval identifier is A1.

| Question 6 Response | Russia | Canada | U.S. |
|---|---|---|---|
| Response Identifier | r2d2 | bc38 | x2ys |

The WDT user has the choice to make the decision based on the data from the survey step. The WDT user may also make the decision based on the data from the approval step since an approver may change one or more responses in the process of approving the survey. The WDT user may make the decision based on the response from the approved survey. In the decision step after A1, the WDT user may enter a conditional statement Sample:

A1.R[r2d2]; A1.R[bc38]; and A1.R[x2ys].

The sample above may provide for three paths in the workflow, one for each response, based on the data from the approved survey.

Example 4—Score Survey

Scores may be calculated upon completion of the survey. The calculations may be taken from all questions in order. Following all questions, the score may be taken for all sections in order, and then from the overall survey. For multi-select questions, scoring expressions may reference scores on the question's responses. Within sections, scoring expressions may reference any question in that section. At the survey level, scoring expressions may reference section or question scores.

Example 4A

Each response in question 2, which may be a multi-select question, may have an assigned score value. The SDT user may want to score the question by assigning it the value of whichever one of the selected responses has the highest value.

| Question 2 Identifier | | g42y | | |
|---|---|---|---|---|
| Question 2 Response | Russia | U.S. | Canada | Mexico |
| Response Identifier | r2d2 | bc38 | m49c | x2ys |
| Response Score | 30 | 80 | 100 | 30 |

The question score expression may be written several ways, listing out each item or referencing the range of values.

1. MAX(R[r2d2].score:R[x2ys].score
2. MAX(R[r2d2:x2ys].score
3. MAX(R[r2d2].score, R[bc38].score, R[m49c].score, R[x2ys].score)."

Within example 4A, if the respondent selected "Canada" and "Mexico," the question score would be 80, as it is the highest value score in the range of selected responses.

Example 4B

Each question in section 3 may have an assigned or calculated score value. The SDT user may want to score the survey section by assigning it the value of whichever question has the lowest value.

| Section 3 Identifier | | g42y | |
|---|---|---|---|
| Question Identifier | r2d2 | bc38 | m49c |
| Question Score | 30 | 80 | 100 |

The question score expression may be written several ways, listing out each item or referencing the range of values.

1. MIN (Q[r2d2:m49c].score)
2. MIN (Q[r2d2].score:Q[m49c].score)
3. MIN (Q[r2d2].score, Q[bc38].score, Q[m49c].score)

In this example, the section score is 30 as it is the lowest value score in the range of questions.

Example 4C

Question number 2 on the survey may be a multi-select question for which each response has an assigned score value. The calculation for the score may be to add the values of each selected response. The SDT user may want to simplify scores to the values 100, 50, or 0.

TABLE C

| Question 2 Identifier | | g42y | | |
|---|---|---|---|---|
| Question 2 Response | Russia | U.S. | Canada | Mexico |
| Response Identifier | r2d2 | bc38 | m49c | x2ys |
| Response Score | 50 | 15 | 5 | 25 |

The question score assignment may be written in several ways:

| Options | Statement |
|---|---|
| simple conditional statement | If Q[g42y].score > 80 then 100 else if Q[g42y].score > 50 then 50 else 0 |
| compound conditional statement | If ((Q[g42y].score > 80, 100), (Q[g42y].score > 50, 50), 0) |
| conditional shorthand symbol | (Q[g42y].score > 80) ? 100 : (Q[g42y].score > 50) ? 50 : 0 |

In this example using table C above, the respondent may have selected every response. Initially the score may be 50+15+5+25 or 95. Since 95 is greater than 80, the question is scored at 100.

Example 4D

Each question within section 3 of the survey may have an assigned score value. The SDT user may want to score the survey section by assigning it a value of either 100 or 0. The value may be determined by first averaging the scores of the questions in the section and then assigning the score based on whether the average is above or below 75.

| Question Identifier | r2d2 | bc38 | m49c |
|---|---|---|---|
| Question Score | 30 | 80 | 100 |

The section score expression may be written several ways:

| Options | Statement |
| --- | --- |
| simple conditional statement | If AVG(Q[r2d2:m49c].score) >= 75 then 100 else 0 |
| compound conditional statement | If ((AVG(Q[r2d2].score:Q[m49c].score) >= 75, 100), 0) |
| conditional shorthand symbol | AVG(Q[r2d2].score:Q[m49c].score) >= 75 ? 100 : 0 |

In this example, the section score is 0 as the average of the answers is 70 ((30+80+100)/3), which is less than 75.

Example 4E

Each section in a survey may have an assigned score. The SDT user may want to score the overall survey by weighting the scores of each section differently.

| Section Identifier | x123 | r124 | s111 |
| --- | --- | --- | --- |
| Section Score | 30 | 80 | 100 |

Sample—Calculation for Example 4E:

$$S[x123].score*0.30 + S[r124].score*0.20 + S[s111].score*0.70.$$

In the sample above, the overall survey score is 95 which is calculated as:

$$30*0.30 + 80*0.20 + 100*0.70 = 9 + 16 + 70 = 95.$$

Example 4F

Question number 27 may be a multi-select question with scores assigned to each response. The SDT user may want to score question 27 based on whether the respondent selected "Russia" from the options in the response list.

TABLE F

| Question 27 Response | Russia | U.S. | Canada | Mexico |
| --- | --- | --- | --- | --- |
| Auto-Generated Response Identifier | r2d2 | bc38 | m49c | x2ys |
| Response Score | 30 | 15 | 5 | 25 |

In this example, the SDT user may want to assign a score of 50 if the respondent selected "Russia." If the respondent did not select "Russia," then the score may be taken as the average of all other answer options selected.

| Options | Statement |
| --- | --- |
| simple conditional statement | If R[r2d2] then 50 else AVG(R[bc38].score:R[x2ys].score) |
| compound conditional statement | If ((r[r2d2], 50), avg(r[bc38:x2ys].score)) |
| conditional shorthand symbol | r[r2d2] ? 50 : avg(r[bc38:x2ys].score) |

If the user selected "US" and "Mexico," the question score may be 20, which may be the average of the "US" and "Mexico" scores of 15 and 25.

Example 4G

Using the same scenario as above, the SDT user may have overwritten the identifiers.

| Question 27 Response | Russia | United States of America | Canada | United Mexican States |
| --- | --- | --- | --- | --- |
| Designer-Assigned Response Identifier | Russia | U.S. | Canada | Mex |

| Options | Statement |
| --- | --- |
| simple conditional statement | If R[Russia] then 50 else AVG(r[US].score:Q[Mex].score) |
| compound conditional statement | If ((r[Russia], 50), avg(r[US:Mex].score)) |
| conditional shorthand symbol | r[Russia] ? 50 : avg(r[US:Mex].score) |

Example 5

The SDT user may write an overall survey score back to the database. This may be enabled by the use of an assignment statement. The SDT user may write the information from the right side of the equal sign to the location identified on the left side of the equal sign. An example of this may be "supplier.risk=survey.score". The SDT user may write the calculated overall survey score to the 'risk' field on the 'supplier' object.

Example 6

The SDT user may wish to write risk levels back to the third-party management database based on a survey score. In this example, the SDT user needs to define both the risk values and the risk ratings:

| Survey Score | >=70 | >=50 | <50 |
| --- | --- | --- | --- |
| Risk Value | 10 | 20 | 30 |
| Risk Rating | Red | Yellow | Green |

There may be two ways to write the assignment statements that will write the risk levels to the third-party management database.

1. Supplier.riskvalue=if ((survey.score >=70, 10), (survey.score >=50, 20), 30)
2. Supplier.riskrating=if ((survey.score >=70, "red"), (survey.score >=50, "yellow"), "green")
3. Write one compound assignment statement—

If Survey.Score >=70 then {supplier.riskvalue=10; supplier.riskrating="red"} else if Survey.Score >=50 then {supplier.riskvalue=20; supplier.riskrating="yellow"} else {supplier.riskvalue=30; supplier.riskrating="green"}

Example 7: Use a Temporary Variable in a Workflow (Decision & Calculate)

The SDT user may wish to create a temporary variable that the WDT user may use in either a decision or calculate step.

Example 7A

The SDT user may create a temporary variable based on the scores of three sections focused on "InfoSec" questions. Based on the value of this temporary variable, the WDT user may use this to drive the appropriate path in the workflow. In this example, the WDT user may use the data from the approval step identified as A1.

1. Survey Write Statement $$InfoSecRisk = S[Asset].score*0.40 + S[Threat].score*0.40 + S[Vulnerability].score*0.20$$

2. Workflow Decision Step Conditional Statements

| Path A | Path B | Path C |
| --- | --- | --- |
| A1. InfoSecRisk >= 1200 | A1. InfoSecRisk >= 900 | A1. InfoSecRisk < 900 |

Here, when the InfoSecRisk is greater than or equal to 1200, the workflow may continue along Path A; when the InfoSecRisk is greater than or equal to 900 (but not greater than or equal to 1200), the workflow may continue along Path B; otherwise, the workflow may continue along Path C.

Example 7B

The SDT and/or WDT user may wish to perform an additional calculation using the same temporary variable as above (InfoSecRisk) as well as a second temporary variable (ComplianceRisk) created in a different survey. The SDT and/or WDT user may wish to perform an additional calculation. In this example, the WDT user may wish to use the data for the second temporary from the approval step identified as A3. The WDT User May Wish to Write this Back to a field on the supplier (Supplier.CIRisk).

In this example below, the value may be written back to the CIRisk field on the supplier.

Sample—Workflow Calculate Step Assignment Statement $$Supplier.CIRisk = (A1.InfoSecRisk + A3.ComplianceRisk)/2$$

Example 8: Writing Survey Data to the Third-Party Management Database

The WDT user will decide where in the workflow it may be appropriate to write data back to the third-party management database. After a survey step, the WDT user may place a result-in-field ("RIF") step on the canvas. The RIF step may identify and write back all survey data on execution of this step. The WDT user may choose to have the step come directly after a survey step or after one (or many) approval steps. Additional configuration may not be required.

Example 9: Data Tags

The WDT user may want to customize a launch email notification so that salutation is addressed to the person designated in the supplier record i.e. —as the relationship manager. Within the survey step, the WDT user may insert a data tag for the field: supplier.relationshipmanager.

Example 10: Comments

A third-party respondent and/or approvers may need to comment to others within a survey at a question, section, or overall survey level. For example, a survey respondent has completed a survey and wants a colleague named John Doe, also a user of the third-party management system, to look over the answers to a few questions before submitting the survey. The "@" symbol may look up usernames, email addresses, and first and last names. The respondent may type any of the following to find the colleague:
1. @John
2. @doe
3. @j.doe@xyz.com
4. @johndoe When the respondent selects the appropriate user, he may write a comment. The comment may auto-generate an email to the colleague. The colleague may respond to the comment, tagging the survey respondent. Once feedback is received from the colleague, the third-party respondent may now confidently submit the survey.

Example 11: Find a Survey in the WDT

A WDT user may need to reference a survey in a workflow step. On the survey step in the workflow, the WDT user may begin typing the name of the survey, and selects it from the list of available surveys, which may be populated based on both the objects assigned to the survey (if applicable) and workflow.

Apparatus and methods described herein are illustrative. Apparatus and methods in accordance with this disclosure will now be described in connection with the figures, which form a part hereof. The figures show illustrative features of apparatus and method steps in accordance with the principles of this disclosure. It is to be understood that other embodiments may be utilized, and that structural, functional and procedural modifications may be made without departing from the scope and spirit of the present disclosure.

The steps of methods may be performed in an order other than the order shown or described herein. Embodiments may omit steps shown or described in connection with illustrative methods. Embodiments may include steps that are neither shown nor described in connection with illustrative methods.

Illustrative method steps may be combined. For example, an illustrative method may include steps shown in connection with another illustrative method.

Apparatus may omit features shown or described in connection with illustrative apparatus. Embodiments may include features that are neither shown nor described in connection with the illustrative apparatus. Features of illustrative apparatus may be combined. For example, an illustrative embodiment may include features shown in connection with another illustrative embodiment.

FIG. 1 shows a third-party management system 100. Third party management system 100 is a system used by a plurality of entities to manage the entities third parties. A system user 114 may be the user associated with an entity. The system user may utilize the system to manage the entity's third parties.

Third party management system 100 may include a survey platform 102 and a workflow platform 104. Within the survey platform 102, survey GUI 106 and survey communication module 108 may be included.

A workflow GUI 110 and a workflow communication module 112 may be included within the workflow platform 104. System user 114 of the third-party management system 100 may be able to access the survey platform 102, via the survey GUI 106. System user 114 may design each third party's survey via the survey GUI 106. System user 114 may manage and edit each third party's survey within the survey GUI 106.

System user 114 may be able to access the workflow platform 104 via the workflow GUI 110. System user 114 may access and manage the workflow of the entities.

Third party management system 100 may also include a data-access tool 116. The data-access tool 116 may be coupled to an API 118. The API may be configured to communicate, in real-time, to the third-party management database 120. The API may be configured to read and write to the database 120. System user 114 may utilize the data-access tool 116 for querying the database 120.

Figure 2:
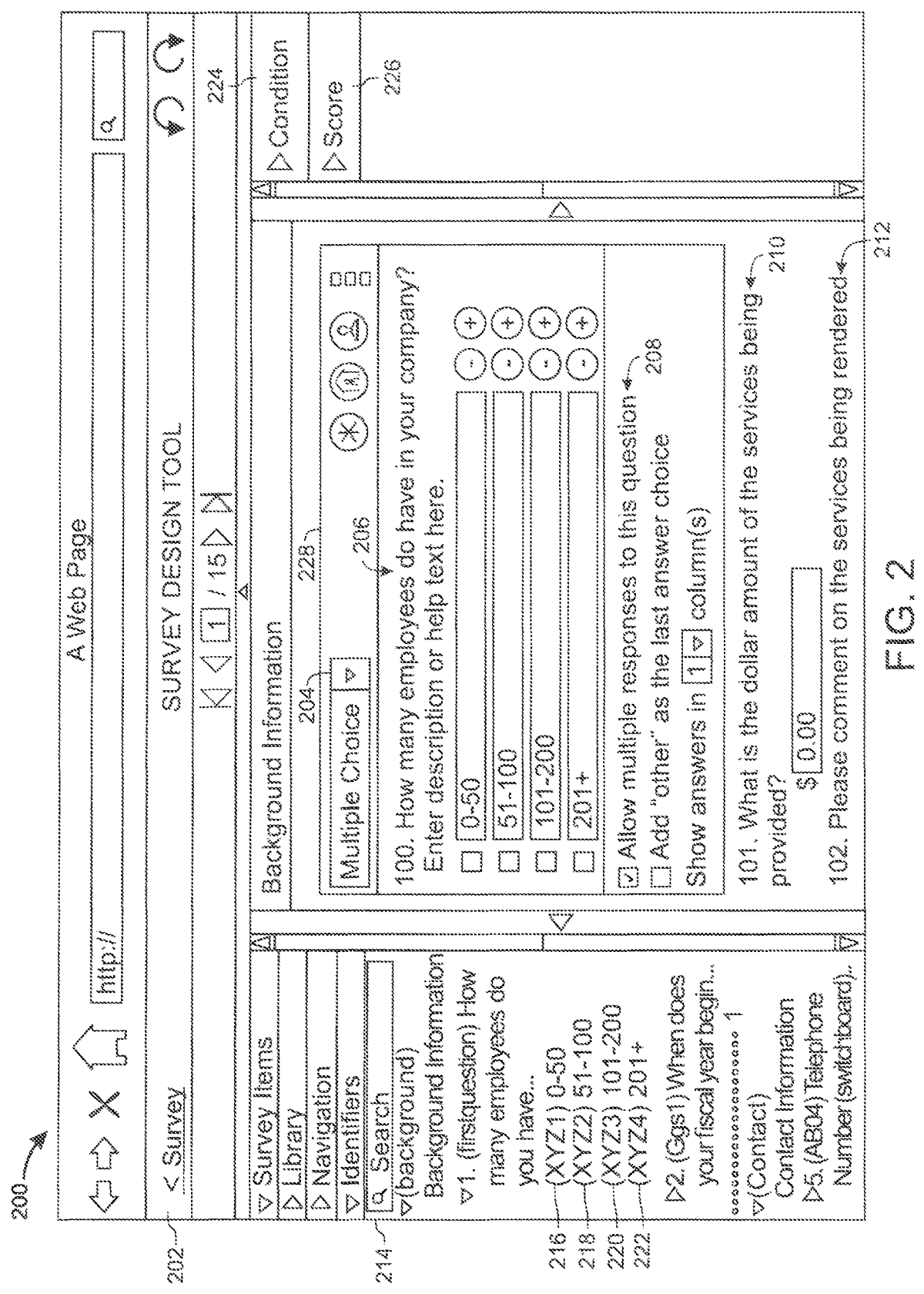

FIG. 2 shows an exemplary portion of a survey design tool ("SDT") 202 within a survey GUI 200. The SDT 202 is a platform where a user may create and customize each survey for each third party. A user may select a section from the plurality of sections within the SDT platform for editing. The SDT platform may include a survey items section, a library section, a navigation section, and/or an identifiers section. The SDT platform may further include a condition section and/or a score section. Each section may be edited within the edit-box 232 of SDT platform 202. In this exemplary SDT platform, question 100 is displayed within the edit-box 232 and the user may set preferences for the question within the edit-box 232. Drop-down list 204 may include one or more options associated with the question. One option may be to set the question to be a multiple-choice question. Another option may be to set the question to be a single select multiple choice question. Another option may be to set the question to be a question enabling user-input. The multiple-choice option is selected, in this example, within the drop-down list 204 for question 100 as seen at 206. Checkbox 208 includes the option to allow multiple responses for the question. Checkbox 208 is selected for question 100 and may therefore enable one or more answer options to be selected by the third-party respondent for this question.

Question number 101 and 102, as shown at 210 and 212, may be questions that require user-input. For questions 101 and 102, the user may select the option for user-input from the drop-down list 204.

Identifier section 214 is the section where the user may view the auto-generated identifiers assigned to each question. The user may select a question from the identifier section 214 and further be enabled to edit the question within edit-box 232. The user may further modify the assigned identifiers and create a different identifier for each question. In this example, question 1 within the identifier section 214 may include four answer options. The first answer option 220 for question 1, has an identifier "xyz1" assigned to the answer option. The second answer option 222 for question 1 has an identifier "xyz2" assigned to the answer option. The third answer option 224 for question 1 has an identifier "xyz3" assigned to the answer option. The fourth answer option 226 for question 1 has an identifier "xyz4" assigned to the answer option. Within the identifier section 214, the user may change the identifiers assigned.

The user may write conditional statements and tag specific questions with a conditional attribute within the conditional section at condition tab 228. The user may set the score value for each answer option, question, section and survey within the score section at score tab 230.

FIG. 3 shows an exemplary survey 300 for a third party. The first three questions from a plurality of questions included in the survey may be displayed on the exemplary survey 300. The first three questions may be questions relating to general information about the third party. Comment statement 302 may be a statement notifying the third-party respondent that some questions may be unavailable/and or invisible until previous responses are provided. The unavailable questions may be questions that have been tagged in the database, with a conditional attribute or a visibility attribute.

Question 1 as shown at 304 may be a required question. The respondent may be required to read the terms and conditions of the survey provided within question 1, prior to responding to the subsequent questions. The question may have a requirement attribute tagged to the question. The requirement attribute may restrict the respondent from omitting responding to the question.

Question 2 as shown at 306 may be a single-select multiple-choice question. Question 2 may require the respondent to select only one answer for the plurality of answer options.

Question 3 as shown at 308 may be a multiple-select multiple-choice question. The third-party respondent may have "headquarters" in numerous countries and may therefore select multiple answer options when answering question 3.

Thus, systems and methods for communicating with a database using non-structured-data-oriented communication have been provided. Persons skilled in the art will appreciate that the present invention can be practiced by other than the described embodiments, which are presented for purposes of illustration rather than of limitation.

What is claimed is:

1. A method for communicating with a third-party management database, as part of a computer-implemented workflow, via an application programming interface ("API") coupled with a data-access tool, the method comprising:

receiving a search-style query for extracting the third-party data from the third-party management database;

searching the third-party management database for one or more variables that are associated with the search-style query;

retrieving, from the third-party management database, a plurality of computer-readable database search strings associated with the one or more variables;

displaying to a user the plurality of computer-readable database search strings that were retrieved; and receiving a user-selected computer-readable database search string from the plurality of computer-readable database search strings that were retrieved, the user-selected computer-readable database search string being based, at least in part, on one or more of the plurality of retrieved computer-readable database search strings, and in response to the receiving the user-selected computer-readable database search string, querying the third-party management database with a new query including the user-selected computer-readable database search string;

returning, to the user, one or more results of the user-selected computer-readable database search string from the third-party management database, the results being a temporary variable, wherein the temporary variable is associated with a supplier risk score;

receiving, from the user, a command to perform a decision step via the data-access tool based on the temporary variable, the decision step determining a specified path to take through the computer-implemented workflow.

2. The method of claim 1, wherein the search-style query comprises a variable name.

3. The method of claim 1, wherein the search-style query comprises a partial variable name.

4. The method of claim 3, further comprising auto-completing the search-style query when the search-style query comprises a partial variable name.

5. The method of claim 1, wherein the search-style query comprises at least one or more of an operator; a parameter; and a keyword.

6. The method of claim 5, further comprising, in response to the receiving of the user-selected computer-readable database search string, querying the third-party management database with a query including the user-selected computer-readable database search string and further including at least one or more of an additional operator; an additional parameter; and an additional keyword.

7. The method of claim 1, further comprising, when one or more variables are not found to be associated with the search-style query,
alerting the user; and prompting the user with auto-generated additional options of words related to the search-style query received.

8. The method of claim 7, wherein the words include one or more: variables; search terms; and query terms.

9. The method of claim 1, further comprising receiving data associated with one or more third party surveys.

10. The method of claim 9, wherein the data associated with one or more third party surveys includes a plurality of questions, each question being individually generated and relating to a third party, each question from the plurality of questions being either a single-select multiple-choice question type or a multiple-select multiple-choice question type, each question comprising:
a plurality of selectable answer options; and
one or more metadata attributes tagged to each question.

11. The method of claim 10, the metadata attributes comprising one or more of:
a score attribute, each selectable answer option having a pre-determined score assigned to the selectable answer option;
a visibility attribute configured to make visible a question and based on a previously selected selectable answer option;
a conditional attribute wherein when the conditional attribute is tagged to a question, the question is displayed when a pre-determined selectable answer option from a previous question is selected; and
a requirement attribute that when tagged to the questions causes a selection of at least one selectable answer option associated with the questions to be made prior to a selectable of answer option from a subsequent question is made.

12. The method of claim 11, further comprising, in response to a selected answer option by a third-party respondent, in real-time:
writing the selected answer option to the third-party management database;
searching the third-party management database for all questions that include:
data relating to data included in the selected answer option;
the visibility attribute tagged to the questions; and
making visible the questions in a third-party survey.

13. A third-party management system configured to enable implementation of non-structured-data-oriented communication with a third-party management database, the system comprising:
an application programming interface ("API") configured to enable communication with the third-party management database via an expression-type language, the API coupled with a data-access tool and configured to accept, from the data-access tool, search-style queries formulated in the expression-type language;
an electronic workflow platform configured to monitor and manage, in real-time, a third-party workflow platform comprising: a workflow graphical user interface ("GUI"); and a workflow communication module that together with the data-access tool and the API enable communication with the third-party management database;
the data-access tool configured to receive from the user, a search-style query into a search-box of the GUI configured to retrieve third party data from the third-party management database;
the API being configured, in response to the data-access tool receiving the search-style query, to: search for one or more variables associated with the search-style query; retrieve, from the third-party management database, a plurality of computer-readable database search strings associated with the one or more variables; display to the user, via the data-access tool, the plurality of computer-readable database search strings that were retrieved; receive a user-selected computer-readable database search string from the plurality of computer-readable database search strings that were retrieved; query the third-party management database with a new query including the user-selected computer-readable database search string; return to the user one or more results of the user-selected computer-readable database search string from the third-party management database, the results being a temporary variable, wherein the temporary variable is associated with a supplier risk score; and receive a command to perform a decision step via the data-access tool based on the temporary variable, the decision step determining a specified path to take through a computer-implemented workflow.

14. The system of claim 13, the system further comprising an electronic survey platform configured to manage and modify, in real time, execution of a plurality of survey data, the electronic survey platform comprising: a survey GUI; and a survey communication module that together with the data access tool and the API are configure to communicate with the third-party management database; the plurality of survey data comprising a plurality of third-party questions associated with a user from a plurality of users of the system.

15. The system of claim 13, each question being either a single-select multi-choice question type or a multiple-selection question type data and each question further comprising: a plurality of selectable answer options; and one or more metadata attributes tagged to each question.

16. The system of claim 14, the metadata attributes including a score attribute and each selectable answer option comprising a pre-determined score assigned to the selectable answer option.

17. The system of claim 14, the metadata attributes including a visibility attribute configured to make visible a question based on a previously selected answer option.

18. The system of claim 14, the metadata attributes comprising a conditional attribute; and the API being configured, when the conditional attribute is tagged to a question, to cause displaying the question only when a predetermined selectable answer option from a previous question is selected.

19. The system of claim 14, the metadata attributes comprising a requirement attribute; and the API being configured, when the requirement attribute is tagged to the question, to require input of a selection of at least one selectable answer option associated with the question prior to a selection of a selectable answer option from a subsequent question.

20. The system of claim 16, the survey communication module being configured, in response to an answer option selected by a third-party respondent, the survey communication module to:
- transmit the selected answer option to the third-party management database in real time;
- search the third-party management database in real time for all questions that include: data relating to the data of the selected answer option; and the visibility attribute tagged to the questions; and
- in real time display the questions in a survey corresponding to the survey data.

* * * * *